UNITED STATES PATENT OFFICE.

COLUMBUS E. THOMPSON, OF BALTIMORE, MARYLAND.

COMBINED PACKING AND LUBRICANT.

SPECIFICATION forming part of Letters Patent No. 420,477, dated February 4, 1890.

Application filed March 13, 1889. Serial No. 303,130. (Specimens.)

*To all whom it may concern:*

Be it known that I, COLUMBUS E. THOMPSON, a citizen of the United States, residing at Baltimore, in the State of Maryland, have invented certain new and useful Improvements in Combined Packing and Lubricant; and I do hereby declare the following to be a full, clear, and exact description of the invention, such as will enable others skilled in the art to which it appertains to make and use the same.

My invention relates to that class of lubricants which are used in conjunction with wool packing to lubricate car-axles and other journals. Heretofore in using packing of this kind it was customary to soak the packing in the lubricant at or about the time it was to be put in the box. This method causes a great waste of material, as there would be more or less drip and slopping of the lubricant while changing it from the pot to the box. Another objection is that the wool waste used for packing has no standard quality or length, and is matted or massed together so that the lubricant does not thoroughly saturate it, nor can it be properly packed in the box. It is also full of dirt, grit, sweepings, jute, and other combustible, inflammable, and foreign matter. These impurities and the manner in which the lubricant and packing have been prepared are the main cause of all the car-axle-box fires.

The object of my invention is to remove all objections to the present manner of using lubricants and packings. Instead of using wool waste, I propose to use for the packing a substance known as "backing-yarn," which is free of all dirt, grit, sweepings, and other impurities and foreign matter. A packing made of this material can be made in any suitable lengths—a very important thing—will be light in weight, and consequently bulky in size in proportion to its weight, will absorb the lubricant and hold it in suspension, and when placed in the boxes will, owing to its lightness and bulk, form an elastic packing that will hold the lubricant in contact with the parts of the journal or machinery that require lubrication.

My preferred manner of using this packing is to have the lubricant and packing prepared for use by mixing them thoroughly together and placed in barrels and cans ready for shipment and use, without the necessity of the consumer handling the packing and lubricant separately, and saving the time and labor usually employed in preparing to pack the axle-boxes.

My invention therefore consists of an improved packing and lubricant, all as will hereinafter be described and claimed in the subjoined specification, wherein I shall describe my preferred manner of mixing the packing and lubricant and point out my preferred lubricants.

The packing, as before stated, is new backing-yarn as it comes from the spinning-machine, which I cut into lengths about fourteen (14) inches long in separate or single strands. This I place in a movable open and shallow pan and pour over it a sufficient amount of lubricant to thoroughly saturate the yarn, which is then placed in barrels and cans ready for shipment and use.

The lubricants which I prefer to use are crude or natural petroleum of 29° gravity, zero-cold test, a product of petroleum known as "cylinder-stock oil," and plumbago or graphite.

The manner of preparing this combination is as follows: Take two hundred and fifty-six (256) pounds of backing-yarn and place it in a pan similar to the one described. Now mix sixty-four (64) pounds of graphite with two hundred and fifty-six (256) gallons limpid oil and pour it upon the backing-yarn, and mix the substances thoroughly with a hoe or fork until the yarn is thoroughly saturated and ready for the barrels or cans.

For winter use the natural oil and graphite are used in combination with the backing-yarn. For summer the cylinder-stock, graphite, and backing-yarn are combined.

For winter or summer use, where the sliding or rolling friction is heavy or great, or where the temperature of the place where the packing is used is cold or hot, or in hot or cold weather, the oil or stock may be used separately or mixed in varying proportions, to overcome the obstacle that may be existing.

What I claim as new is—

The combination of a packing made of backing-yarn and a lubricant consisting of plumbago or graphite and natural petroleum or cylinder-stock or both of the latter, substantially as described.

In testimony whereof I affix my signature in presence of two witnesses.

COLUMBUS E. THOMPSON.

Witnesses:
S. A. MORSE,
GEO. MCCAFFRAY.